United States Patent
Lykens

(10) Patent No.: US 6,453,588 B1
(45) Date of Patent: Sep. 24, 2002

(54) MAGNETICALLY RECEPTIVE SHOPPING CART CARRIER PLATE

(76) Inventor: Thomas B. Lykens, 204 Winnebago Dr., Lake Winnebago, MO (US) 64034

( * ) Notice: Subject to any disclaimer, the term of this patent is extended or adjusted under 35 U.S.C. 154(b) by 0 days.

(21) Appl. No.: 09/537,113

(22) Filed: Mar. 27, 2000

(51) Int. Cl.[7] .............................. G09F 3/00; B62D 39/00
(52) U.S. Cl. ..................................... 40/308; 280/33.992
(58) Field of Search .............................. 40/308, 661.01, 40/600; 280/33.992

(56) References Cited

U.S. PATENT DOCUMENTS

| | | | |
|---|---|---|---|
| 2,864,189 A | * 12/1958 | Campbell ..................... 40/308 |
| 2,888,761 A | * 6/1959 | Miller ........................... 40/308 |
| 3,150,296 A | 9/1964 | McIntosh |
| 3,539,204 A | 11/1970 | Keller |
| 3,993,319 A | 11/1976 | Day |
| 4,100,684 A | 7/1978 | Berger |
| 4,156,318 A | 5/1979 | Economy |
| 4,423,888 A | 1/1984 | Addison |
| 4,496,058 A | 1/1985 | Harris et al. |
| 4,512,504 A | 4/1985 | Owlett |
| 4,583,753 A | * 4/1986 | Economy ................. 280/33.99 |
| 4,685,701 A | * 8/1987 | Amundson et al. ........... 281/42 |
| 4,743,050 A | 5/1988 | Small |
| 4,858,353 A | 8/1989 | Krebs |
| 4,865,285 A | 9/1989 | Gaggianse |
| 5,004,252 A | 4/1991 | Kraper |
| 5,072,957 A | * 12/1991 | Graebe, Jr. ..................... 211/50 |
| 5,086,960 A | * 2/1992 | Schwietzer ................. 224/277 |
| 5,154,330 A | 10/1992 | Haynes |
| 5,566,609 A | * 10/1996 | Kirschner ..................... 108/42 |
| 5,947,304 A | 9/1999 | Thorpe |
| 5,955,170 A | 9/1999 | Davis et al. |
| 6,000,610 A | * 12/1999 | Talbott et al. ............... 235/383 |
| 6,250,006 B1 | * 6/2001 | Berrier ......................... 40/666 |

* cited by examiner

Primary Examiner—Lynne A. Browne
Assistant Examiner—Kenn Thompson

(57) ABSTRACT

A magnetically receptive carrier plate 20 for a conventional shopping cart 10 is provided for the convenient in-store use of magnetic mount shopping aids such as a notepad/coupon holder 30, writing implement holder 60 or calculator 23. The magnetically receptive carrier plate 20 is rotatable around the handlebar 11 of a conventional shopping cart 10 and can present either magnetically receptive surface 20a or 20b to the shopper for the convenient magnetic mounting of portable notepad/coupon holder 30, pencil holder 60 or calculator 23. Supported on one side by the handlebar holder 21, the other end of the carrier plate rests on either the upper rear transverse rod 13 or the child seat upper transverse rod 14 of the cart 10. Additionally, the carrier plate can be rotated rearwardly over the handlebar 11 toward the shopper to hang downwardly in front of the shopper. In this orientation the accessories 23, 30 and 60 can be magnetically secured to the now vertical surface 20b and are safely and conveniently out of the reach of a child occupying the child's seat 12.

6 Claims, 2 Drawing Sheets

MAGNETICALLY RECEPTIVE SHOPPING CART CARRIER PLATE

BACKGROUND—Field of Invention

This invention relates to shopping cart impovements, specifically to a magnetically receptive, planar carrier plate, rotatably attached to the shopping cart handle bar, providing working surfaces for magnetically mounting, portable shopping accessories.

BACKGROUND—Description of Prior Art

The use of shopping lists in grocery stores is almost universal and at any time, in almost any grocery store, one can observe shoppers trying to maneuver their carts, open display doors, and pick items from the shelves while unsatisfactorily trying to accommodate the use of their shopping lists, coupons, pens and calculators. Over the years there have been many attempts to address the problem of what to do with one's shopping accessories while one actually shops. The attempted solutions of the past have all had various shortcomings as must be evident by the fact that a problem experienced by almost every shopper remains with us today.

U.S. Pat. No. 3,539,204 to Theodore F. Keller (Nov. 10, 1970) shows one attempted solution using a clipboard. His extruded plastic device uses an integrated clip to secure a shopping list and pencil and provide a writing platform for the shopper, however it lacks robustness because of its plastic construction, is accessible to a child in the cart's child seat and is relatively expensive to make.

U.S. Pat. No. 3,993,319 to Guy C. Day (Nov. 23, 1976) primarily describes a check writing surface with no means for securing any accessories, and when in use interferes with access to the upper bin of the shopping cart which also doubles as the collapsible child's seat area.

In U.S. Pat. No. 4,156,318 to George C. Economy (May 29, 1979), Mr. Economy shows an attachment constructed as an integral unit of synthetic material that has a flat upper surface with means such as a biasing clamp for releasably holding a shopper's list and pencil. It, like Day's patent, also interferes with the use and function of the upper bin/child seat area of the cart because the attachment spans the top of the child seat from the top of the cart basket to the back of the seat.

U.S. Pat. No. 4,423,888 to William D. Addison (Jan. 3, 1984) does describe a permanent planar shopping cart attachment that rotates from a horizontal position when in use to a suspended position for storage, however, Addison, also relies on clips on one surface to secure a shopping list and coupons. This device can only be useful in the horizontal position where it is accessible to an occupant of the child seat. If this attachment were rotated around the handlebar to the suspended vertical position, the side on which the shopping list and coupons are clipped would now be uselessly on the side opposite the shopper.

U.S. Pat. No. 4,496,058 to Garrett R. Harris and Francis T. Harris (Jun. 29, 1985) shows a detachable shopper's helper assembly comprised of a flat rigid board of pressedboard, wood, plastic, etc., divided into three main areas. The "helper" is clipped onto the handle bar of the cart and provides the shopper with a clipboard for a shopping list, a shallow bin for coupons and another spring clip for a pen or pencil.

U.S. Pat. No. 4,512,504 to Lois Owlett (Apr. 23, 1985) shows a flexible purse like device that is suspended by a flap folded over the cart's handlebar.

U.S. Pat. No. 4,743,050 to LaRue D. Small (May 10, 1988) describes yet another shopping cart clipboard attachment. One member of this permanently mounted clipboard is clamped to one of the vertical walls of the shopping cart. Although the attachment is metallic and pivotally mounted, it still relies on the use of a mechanical spring clip to secure the notepad and pencil to the attachment. Like the others, it restricts access to the upper bin area or child seat and it is within easy reach of small hands if the child seat is occupied. In addition, it is unusable to the shopper when rotated away from the child seat area and into the vertical storage position.

U.S. Pat. No. 4,858,353 to Arthur D. Krebs (Aug. 22, 1989) describes another grocery shopper organizer which is a generally flat board adapted to support coupons for groceries on the top surface of the board as well as other accessories such as a shopping list, calculator, pen, etc. The board is detachably mounted on the upper edge of any upright wall of the cart by an open-bottom channel strip on the bottom surface of the board near the front edge. The board acts as a counterweight and the accessory is precariously mounted in an inclined position as the channel locks onto the top of an upright wall. Krebs shows the use of Velcro-like material, a pencil clip and elastic bands to secure the usual shopping accessories. This inventor does address the problem of a small child in the cart seat, but his solution is to mount the organizer extending outwardly from the shopping cart into aisle space where it would be easily dislodged.

U.S. Pat. No. 5,004,252 to Wayne Kraper (Apr. 2, 1991) shows another flat surface attachment. In addition to providing a check writing surface, the flat surface partition is designed as a security barrier to actually cover the bin area/child seat so that a shopper may place personal items such as a purse or calculator beneath the partition to thwart purse snatchers.

U.S. Pat. 5,154,330 to William C. Haynes (Oct. 13, 1992), Haynes teaches a magnetically mounted shopping list holder that is transported from the ubiquitous refrigerator door to the super market, where it is then precariously attached to a top rail of a shopping cart. The fastening mechanism incorporates a swivel eye, hook and shank, and mounting rod to attach the clipboard to the cart.

None of these examples of prior art suggests the simplicity of my solution. A permanently attached magnetically receptive carrier plate that is rotatably secured around the handlebar of a shopping cart providing a simple, uncluttered surface for the magnetic attachment of desired shopping accessories. Since the advent of inexpensive adhesively secured magnetic tape, more and more products are being marketed for magnetic attachment to convenient vertical magnetically receptive surfaces such as refrigerator doors and filing cabinets. There are a wide variety of magnetically mounted clips, holders and shopping lists such as the ones marketed by DayRunner. Because my shopping cart carrier plate is magnetically receptive, it needs no clips, clamps, bands, bins, Velcro, hooks and eyes, etc., to secure desired magnetic shopping accessories. The carrier plate is not only useful in a generally horizontal position, but also when it is suspended vertically from the shopping cart's handlebar. In this configuration the magnetic mount accessories are safely positioned out of the reach of a child in the child's seat but yet remain easily accessible to the shopper. Since both surfaces of the rotatable carrier plate are magnetically receptive and the plate can be used in multiple positions, no area of useful shopping cart space is sacrificed.

OBJECTS AND ADVANTAGES

Accordingly, several objects and advantages of my invention are:

(a) to provide a permanent, inexpensive, weatherproof and durable shopping cart carrier plate improvement that provides two flat magnetically receptive surfaces;

(b) to provide a carrier plate improvement for magnetically mounting portable shopping accessories such as a notepad/coupon holder, pencil, calculator, personal digital assistant etc.;

(c) to eliminate the aggravation and inconvenience of juggling a pen, list, and calculator while maneuvering a shopping cart, opening freezer doors, grasping selected articles for purchase and placing them in the cart;

(d) to provide a carrier plate for magnetically attaching accessories that are handy to the shopper when mounted on the carrier plate's first surface when in a horizontal position, and are also easily accessible when hanging in a vertical orientation attached to the opposite or second surface of the carrier plate;

(e) to eliminate the inferior and costly methods of the past portable inventions relying on various combinatorial deployments of clips, clamps, bins, pockets, Velcro, elastic bands, hooks and eyes etc. to secure the accessories to their attachments, and the attachments to the shopping cart;

(f) to provide an carrier plate that permits full use of the cart's carrying capacity;

(g) to provide a carrier plate that can be easily retrofitted to existing conventional carts or included by the original equipment manufacturer;

(h) to provide a carrier plate that preserves the ability of conventional shopping carts to be stored in the familiar nesting or telescoping space saving manner;

(i) to provide a laterally movable carrier plate improvement that is convenient to use by both left and right handed shoppers;

Still further objects and advantages will become apparent from a consideration of the ensuing description and accompanying drawings.

PREFERRED EMBODIMENT—Description

FIGS. 1–4 Magnetically Receptive Shopping Cart Carrier Plate

Figure 1:
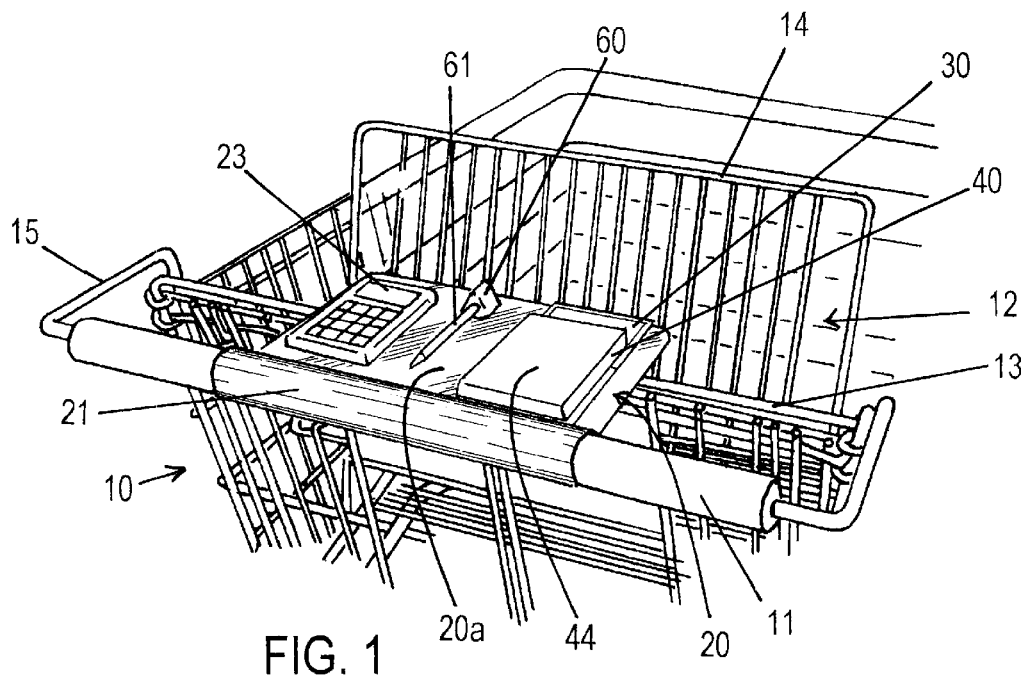
FIG. 1 is a perspective view of carrier plate mounted on a conventional shopping cart.

FIG. 1 shows magnetically receptive carrier plate 20 attached to handlebar 11 connected to connecting rod 15 of conventional shopping cart 10 (partially shown) with familiar child's seat 12 in the open configuration. Perfect-bound notepad 40 and notepad/coupon holder 30, pencil 61 and pencil holder 60, and calculator 23 are magnetically secured to carrier plate surface 20a. Plate 20 is supported by rear upper transverse rod 13 of shopping cart 10 and is rotatably attached to handlebar 11 by handlebar holder 21.

Figure 2:
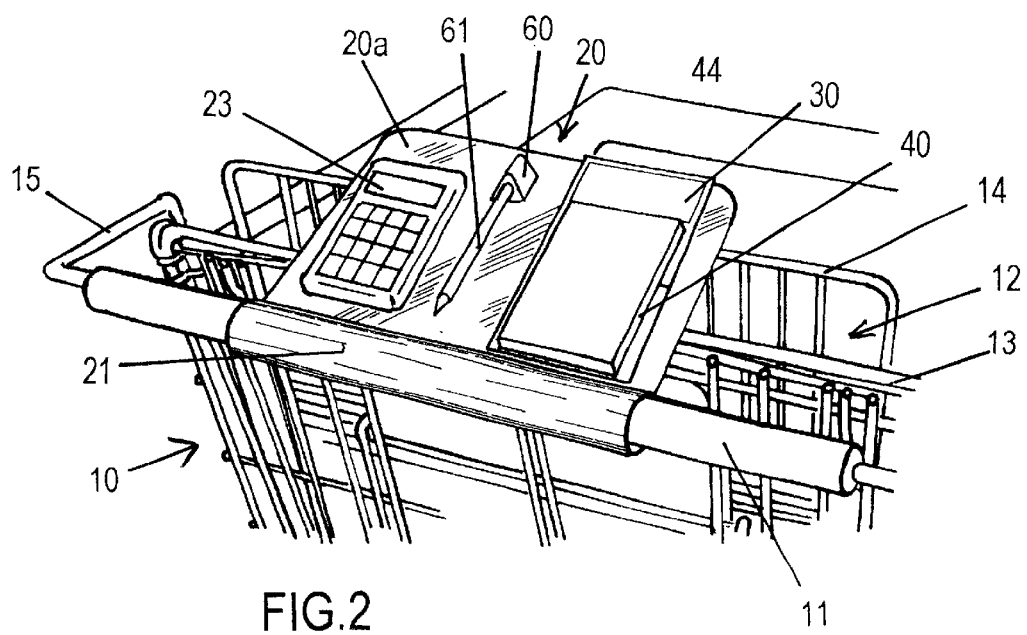
FIG. 2 is a similar view showing the carrier plate in use with the shopping cart's child's seat in the folded position.

FIG. 2 is a similar view as FIG. 1 but it shows seat 12 of cart 10 (partially shown) in folded or collapsed configuration. Carrier plate 20 has been rotated upwardly around handlebar 11 which is connected to connecting rod 15 and plate 20 rests on child's seat upper transverse rod 14. Accessories 23, 30, and 60 are attached to carrier plate surface 20a.

Figure 3:
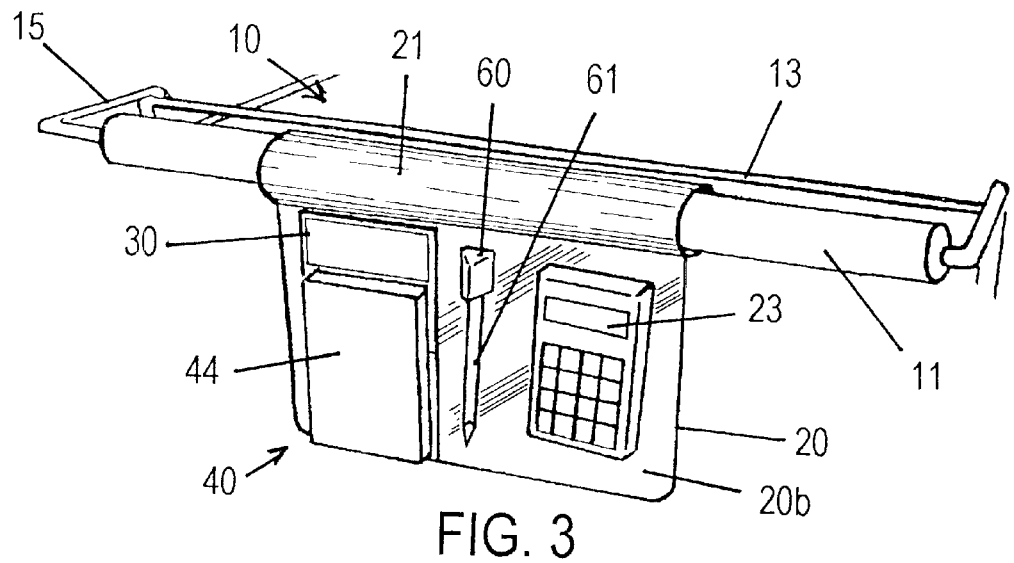
FIG. 3 is a perspective view of the carrier plate suspended from the shopping cart's handle bar.

FIG. 3 is a perspective view showing handlebar 11 attached to connecting rod 15 of shopping cart 10 (partially shown) and rear upper transverse rod 13 of cart 10. In this view, carrier plate 20 is rotated over the handlebar 11 and hangs in a generally vertical orientation. Notepad 40 and notepad/coupon holder 30, pencil 61 and pencil holder 60, and calculator 23 are now magnetically mounted to carrier plate surface 20b.

Figure 4:
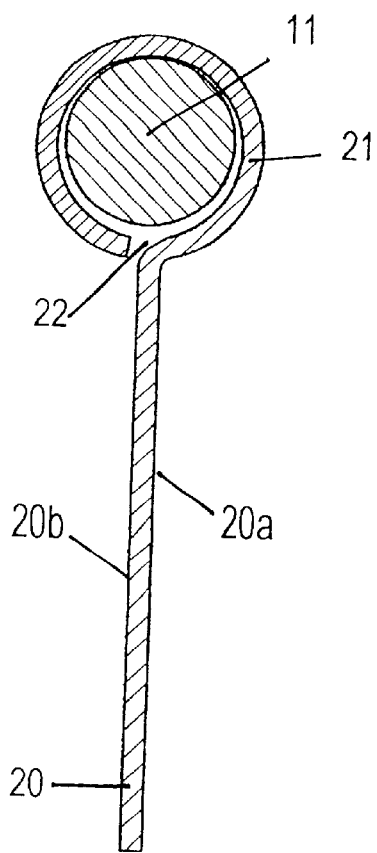
FIG. 4 is a sectional view showing the carrier plate and shopping cart handle bar.

FIG. 4 shows a cross section of carrier plate 20, front surface 20a, and rear surface 20b suspended by handlebar 11. Handlebar 11 extends through circular channel 22 of handlebar holder 21.

PREFERRED EMBODIMENT—Operation

The operation of the carrier plate 20 improvement secured to a conventional shopping cart 10 is really quite simple. The plate 20 provides two magnetically receptive surfaces, 20a and 20b, for magnetically securing a notepad/coupon holder 30, a pencil holder 60 and a calculator 23. The carrier plate 20 is rotatably attached to the shopping cart handlebar 11 by means of a circular channel 22 running through the handlebar holder 21. Because the plate 20 is rotatable, either surface 20a or surface 20b is available for magnetic mounting of shopping accessories (23, 30 and 60) depending on the needs of the shopper.

In FIG. 1 the carrier plate 20 is supported on the rear upper transverse rod 13 of shopping cart 10. The plate 20 extends outwardly and somewhat downwardly from handlebar 11 because on most conventional shopping carts the handlebar 11 is necessarily higher than the rear upper transverse rod 13 in order to facilitate the well-known nesting or telescoping storage characteristic of most carts.

When the child's seat 12 is collapsed toward the upper transverse rod 13, the carrier plate 20 rests on the child's seat upper transverse rod 14 as is shown in FIG. 2 instead of the upper transverse rod 13 shown in FIG. 1. The notepad/coupon holder 30, pencil holder 60 and calculator 23 are again conveniently, magnetically mounted on carrier plate surface 20a, which is now slightly inclined toward the shopper.

If desirable, the shopper can rotate carrier plate 20 completely over the handlebar 11 and use the plate 20 in a hanging vertical orientation as shown in FIG. 3. Holders 30 and 60 and the calculator 23 are magnetically secured to surface 20b which now faces the shopper. Using plate 20 in this way places the accessories 23, 30 and 60 on the surface facing away from a child and beyond his/her reach if occupying seat 12, but they remain handy to the shopper. In addition, because the handlebar holder 21 loosely surrounds the handlebar 11 which runs through circular channel 22, it provides additional lateral movability for the carrier plate 20 along the handlebar 11 accommodating right and left-handed shoppers in any of the previous positions shown in FIGS. 1–3.

The magnetically receptive carrier plate 20 attached to a shopping cart 10 makes possible the convenient in-store use of transportable magnetic mount accessories such as a notepad/coupon holder 30, pencil holder 60 and calculator 23. The result is a simplified shopping experience without having to juggle the above desirable accessories while simultaneously maneuvering a shopping cart down crowded aisles, opening display doors and placing items in the cart.

CONCLUSIONS, RAMIFICATIONS, AND SCOPE

Accordingly, it can be seen from the foregoing description that an inexpensive rotatable magnetically receptive shopping cart carrier plate would be a great aid to shopping convenience. Because the rotatable carrier plate is simply a two-sided planar attachment with both surfaces receptive to magnetic attraction, the various clips, clamps, bands, Velcro, bins and other item retention means of past attempts are unnecessary and irrelevant. Magnetically mountable shopping aids can be releasably mounted in any position convenient for a left or right handed person and on either side of the rotatable carrier plate whether in a vertical or substantially horizontal orientation.

Although the description above contains many specificities, these should not be construed as limiting the scope of the invention but as merely providing illustrations of some of the presently preferred embodiments of this invention. Various other embodiments and ramifications are possible within its scope. For example, the carrier plate could extend the full width of the shopping cart handle and have holes cut out for conveniently grasping the handlebar. Or the rotatable carrier plate handle holder could be modified to simplify retrofitting the attachment to existing shopping carts.

Thus the scope of the invention should be determined by the appended claims and their legal equivalents, rather than by the examples given.

What is claimed is:

1. A magnetically receptive carrier plate in combination with a conventional shopping cart having a parcel receptacle which is supported by wheels accommodating movement of the receptacle throughout the store, said receptacle having a rear upper transverse rod and a conventional foldable child seat or an upper article bin, and said child seat and upper article bin having an upper transverse rod, said shopping cart having a handlebar means extending transversely of the receptacle, and at a predetermined distance rearwardly of the receptacle, which provides manually-operable means by which the user may maneuver said shopping cart in the store, said carrier plate having means for being rotatably attached to handlebar of said shopping cart, said carrier plate is rotatable between a first relatively vertical position in which said plate hangs downwardly from handlebar of conventional shopping cart, and to at least one other position when said plate is rotated rearwardly, upwardly, then forwardly, about 270 degrees over handlebar until said carrier plate rests on an upper transverse rod parallel to handlebar of said shopping cart including either the rear upper transverse rod of said shopping cart receptacle or the upper transverse rod of said foldable child's seat or upper bin of the shopping cart, said carrier plate having a first magnetically receptive surface and a second magnetically receptive surface whereby objects can be magnetically secured to said surfaces, said magnetically receptive surfaces being generally planar.

2. The device of claim 1 wherein said carrier plate and rotatable means are comprised of magnetically receptive material.

3. The device of claim 1 wherein said rotatable means is comprised of synthetic material.

4. A magnetically receptive carrier plate in combination with a conventional shopping cart having a parcel receptacle which is supported by wheels accommodating movement of the receptacle throughout the store, said receptacle having a rear upper transverse rod and a conventional foldable child seat or an upper article bin, and said child seat and upper article bin having an upper transverse rod, said shopping cart having a handlebar means extending transversely of the receptacle, and at a predetermined distance rearwardly of the receptacle, which provides manually-operable means by which the user may maneuver said shopping cart in the store, said carrier plate having means for being rotatably attached to handlebar of said shopping cart;

said carrier plate being laterally movable along length of said shopping cart's handlebar;

said carrier plate is rotatable between a first relatively vertical position in which said plate hangs downwardly from handlebar of conventional shopping cart, and to at least one other position when said plate is rotated rearwardly, upwardly, then forwardly, about 270 degrees over handlebar until said carrier plate rests on an upper transverse rod parallel to handlebar of said shopping cart including either the rear upper transverse rod of said shopping cart receptacle or the upper transverse rod of said foldable child's seat or upper bin of the shopping cart, said carrier plate having a first magnetically receptive surface and a second magnetically receptive surface whereby objects can be magnetically secured to said surfaces, said magnetically receptive surfaces being generally planar.

5. The device of claim 4 wherein said carrier plate and rotatable means are comprised of magnetically receptive material.

6. The device of claim 1 wherein said rotatable means is comprised of synthetic material.

* * * * *